(12) United States Patent
Besenhard et al.

(10) Patent No.: US 7,566,479 B2
(45) Date of Patent: Jul. 28, 2009

(54) METHOD FOR THE SYNTHESIS OF SURFACE-MODIFIED MATERIALS

(75) Inventors: Jürgen Otto Besenhard, Graz (AT); Mario Wachtler, Rome (IT); Joong-Hee Han, Graz Neuhart (AT); Angelika Basch, Graz (AT)

(73) Assignee: LG Chem, Ltd. (KR)

( * ) Notice: Subject to any disclaimer, the term of this patent is extended or adjusted under 35 U.S.C. 154(b) by 279 days.

(21) Appl. No.: 10/602,251

(22) Filed: Jun. 23, 2003

(65) Prior Publication Data

US 2004/0258836 A1     Dec. 23, 2004

(51) Int. Cl.
  B05D 7/00    (2006.01)
  B05D 3/00    (2006.01)
(52) U.S. Cl. ............ 427/376.2; 427/189; 427/212
(58) Field of Classification Search .......... 427/376.2, 427/212, 189
  See application file for complete search history.

(56) References Cited

U.S. PATENT DOCUMENTS

| 5,705,219 | A | 1/1998 | Besenhard et al. |
| 5,869,208 | A | 2/1999 | Miyasaka |
| 5,916,485 | A | * | 6/1999 | Besenhard et al. ......... 252/511 |
| 6,235,182 | B1 | 5/2001 | Bele et al. |
| 2002/0114993 | A1 | * | 8/2002 | Miyaki et al. ............. 429/137 |

FOREIGN PATENT DOCUMENTS

| DE | 19922522 | 11/2000 |
| EP | 0836238 A1 | 4/1998 |
| JP | 08-236114 | 9/1996 |
| WO | WO 0070694 | 11/2000 |

OTHER PUBLICATIONS

M.M. Thackeray, in: Handbook of Battery Materials, ed. J.O. Besenhard, Wiley-VCh, Weinheim, Germany, 1999, pp. 293-321.
T. Ohzuku, in: Handbook of Batteries, ed. J.O. Besenhard, Wiley-VCh, Weinheim, Germany, 1999, pp. 323-336.
G.M. Ehrlich, in: Handbook of Batteries, 3.ed., eds. D. Linden, T.B. Reddy, McGraw-Hill, New York, USA, 2001, chapter 35, pp. 1-3.

* cited by examiner

Primary Examiner—Brian K Talbot
(74) Attorney, Agent, or Firm—Cantor Colburn LLP

(57) ABSTRACT

Disclosed is a method for producing surface-modified materials, such as core-shell materials with the core and the shell (s) being different distinct phases, or materials with a concentration gradient of one or more dopant or substituent element(s) from the surface to the bulk. The method comprises (i) treating the bulk of material with a solution containing a first solvent and at least one flocculant comprising a soluble polymer so that the flocculant adheres to the bulk; (ii) subsequently contacting the flocculant-treated bulk of step (i) with a dispersion containing a second solvent and the particulate solid particles to deposit the particulate solid particles on the flocculant-treated bulk; and (iii) subsequently treating the resultant of step (ii) with heat. This method can in particular be applied to produce surface-modified cathode materials for Li batteries with improved performance.

8 Claims, 3 Drawing Sheets

METHOD FOR THE SYNTHESIS OF SURFACE-MODIFIED MATERIALS

BACKGROUND OF THE INVENTION

1. Field of the Invention

The invention relates to a method producing surface-modified materials, such as core-shell materials with the core and the shell(s) being different distinct phases, or materials with a concentration gradient of one or more dopant or substituent element(s) from the surface to the bulk, wherein the method can in particular be applied to produce surface-modified cathode materials for Li batteries with improved performance.

2. Description of the Related Art

The standard cathode materials for Li batteries, such as $LiNiO_2$, $LiCoO_2$, $LiNi_{1-x}Co_xO_2$, or $LiMn_2O_4$ have some shortcomings during overcharge and at elevated temperatures (e.g. M. M. Thackeray, in: Handbook of Battery Materials, ed. J. O. Besenhard, Wiley-VCh, Weinheim, Germany, 1999, p. 293; G. M. Ehrlich, in: Handbook of Batteries, 3.ed., eds. D. Linden, T. B. Reddy, McGraw-Hill, New York, USA, 2001, p. 35-1). For instance, $LiCoO_2$ and $LiNiO_2$ suffer from decomposition by oxygen loss in the over-charged state in particular at higher temperatures. Especially the decomposition of $LiNiO_2$ is accompanied by a strong self-heating which bears the risk of a thermal run-away of the battery. $LiMn_2O_4$ shows a limited performance due to (i) electrolyte decomposition with the formation of H2O and acidic impurities, (ii) disproportionation of $Li_xMn_2O_4$ according to $$2\ Mn^{3+} \rightarrow Mn^{4+} + Mn^{2+}$$

and dissolution of $Mn^{2+}$ into the electrolyte, which is promoted by acid-induced delithiation and which increases with increasing temperature, and (iii) Jahn-Teller distortion of discharged $Li_1Mn_2O_4$.

A possibility to improve the performance of said cathode materials is the doping/partial substitution of Co, Ni, and Mn with other elements, such as Al, Mg, Ti, etc. This doping/substitution may result in a structural stabilization and/or a modification of the electronic properties of the material. The modification may concern the whole bulk of the material, or its surface only. A modification of the surface is, for instance, possible by coating with suitable compounds.

A widely applied coating technique for the production of surface-modified materials in general, and for cathode materials for Li batteries in particular, is the coating of a paste containing the material to be coated, a binder and/or solvents (e.g. T. Aono, M. Kato, N. Inoue, Y. Miyaki, H. Tomiyama, H. Ishizuka, M. Kabutomori, EP 836,238; T. Miyasaka, U.S. Pat. No. 5,869,208). Besides, other coating techniques have been described including, for instance, sputtering, vacuum evaporation, CVD (Chemical Vapor Deposition) (N. Nishida, Y. Shoji, M. Jinno, K. Nishio, T. Saito, JP 08-236114), sol-gel methods, and hydrolysis methods (R. Oesten, U. Heider, A. Kühner, N. Lotz, M. Nieman, DE 19922522; N. Lotz, U. Heider, A. Kuehner, M. Nieman, R. Oesten, WO00/70694).

However, these techniques have some significant drawbacks and limitations. For instance, CVD is not really a suitable process for the coating of large quantities of small particle powders. By sol-gel and related hydrolysis-based processes the choice of materials which can be easily and economically deposited is fairly limited. Also, carbon black can not be coated with sol-gel methods.

SUMMARY OF THE INVENTION

The object of the present invention is to provide a method for producing the surface-modified material, comprising the steps of (i) treating the bulk of material with a solution containing a first solvent and at least one flocculant comprising a soluble polymer so that the flocculant adheres to the bulk;

(ii) subsequently contacting the flocculant-treated bulk of step (i) with a dispersion containing a second solvent and the particulate solid particles to deposit the particulate solid particles on the flocculant-treated bulk; and (iii) subsequently treating the resultant of step (ii) with heat.

Further, the object of the present invention is to provide a method for producing core-shell materials with the core and the shell(s) being different distinct phases, or materials with a concentration gradient of one or more dopant or substituent element(s) from the surface to the bulk.

DETAILED DESCRIPTION OF THE PREFERRED EMBODIMENTS

Figure 1:
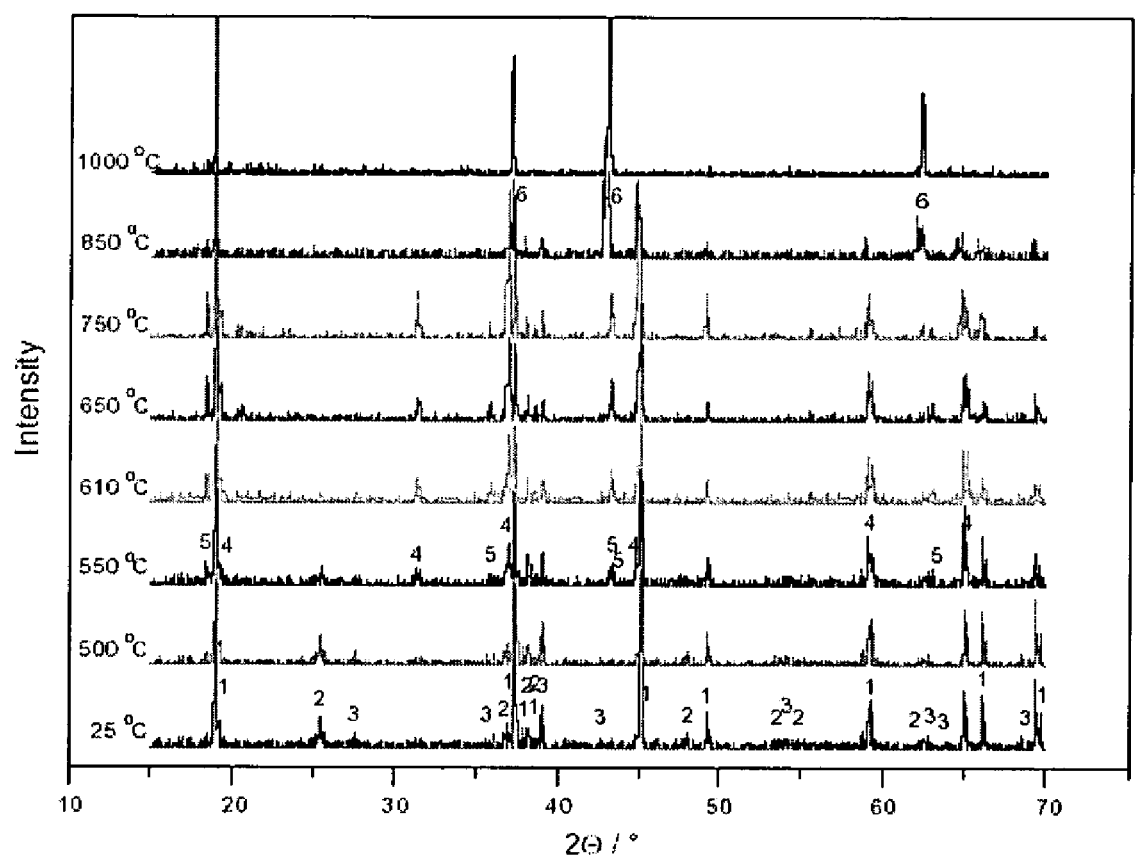
FIG. 1 is a graph showing evolution of the X-ray diffraction patterns of $TiO_2$-coated $LiCoO_2$ prepared by Example 1 during heating from room temperature to 1000° C. (top) is survey, (bottom) are selected diffraction patterns taken at various temperatures. The numbers refer to the various phases, 1 : $LiCoO_2$, 2: $TiO_2$ anatase, 3: $TiO_2$ rutile, 4 : $Co_3O_4$, 5: $Li_2TiO_3$, and 6: CoO. The phases are only assigned in those spectra where they appear for the first time.

The so-called "substrate-induced coagulation" (SIC) process (also called "substrate-induced deposition" process), a dip-coating process for coating substrates with fine-particulate solids from dispersion, was developed for coating through-holes in printed wiring boards with carbon black, in order to create a conductive layer for subsequent electroplating (J. O. Besenhard, O. Claussen, H.-P. Gausmann, H. Meyer, H. Mahlkow, U.S. Pat. No. 5,705,219; J. O. Besenhard, O. Claussen, H. Meyer, M. Kühlkamp, U.S. Pat. No. 5,916,485; and M. Bele, J. O. Besenhard, S. Pejovnik, H. Meyer, U.S. Pat. No. 6,235,182).

In the standard SIC process, the surface of the substrate is first covered with a thin layer of a macromolecular flocculent by dip-coating the substrate in an aqueous solution of this flocculant. The flocculant is typically a polyelectrolyte such as gelatine. Then, the conditioned substrate, i.e. the flocculant-covered substrate, is brought into contact with surfactant-stabilized dispersions of small particles again by dip-coating. The flocculant thereby causes coagulation or enhances deposition of the dispersed particles on the surface of the substrate. There is no bulk coagulation in the dispersion as the macromolecular flocculants are practically immobilized on the surface of the substrate.

The standard SIC process as described in U.S. Pat. No. 5,705,219, U.S. Pat. No. 5,916,485, and U.S. Pat. No. 6,235,182 uses aqueous solutions of the flocculant(s) and also aqueous dispersions of the small particles to be coated on the conditioned surfaces. Aqueous solutions will be preferred whenever possible. However, some substrates and/or particles may undergo undesired reactions in contact with water, and should hence be treated in non-aqueous solvents. SIC is a very versatile method, which can also be extended non-aqueous solvents. It is hence well-suited for water-sensitive materials.

Further, in comparison with simple absorption, much larger amounts of particles can selectively be deposited at the surface with this substrate-induced local coagulation.

The inventors found that the standard SIC process may be used in many more fields and, in particular, for coating various kinds of the bulk of material with various kinds of particulate solid particles, thus creating surface-modified materials.

A central point of the present invention is the method for producing core-shell materials with the core and the shell(s) being different distinct phases, or materials with a concentration gradient of stoichiometry of one or more dopant or substituent element(s) from the surface to the bulk, by modifying the standard SIC process in combination with heat-treatment.

The present invention modifies the standard SIC process into the process consisting of steps of (i) treating the bulk of material with a solution containing a first solvent and at least one flocculant comprising a soluble polymer so that the flocculant adheres to the bulk; and (ii) subsequently contacting the flocculant-treated bulk of step (i) with a dispersion containing a second solvent and the particulate solid particles to deposit the particulate solid particles on the flocculant-treated bulk, which hereafter is referred to "the SIC process of the present invention".

Materials with a modified surface, e.g. particles with a core-shell structure, are of considerable interest in battery technology as the optimization of bulk and surface properties of the active mass particles in the anodes and cathodes usually requires more than one material. Particles with core-shell structure find also applications in other fields, such as pigments, pharmaceuticals, plastics, or catalysts.

The method of the present invention can be used to produce electrode materials for energy-storage devices, such as batteries, super-capacitors, and fuel cells. Furthermore, the method of the present invention can be used to produce cathode materials with modified surface layers for Li batteries, Li-ion batteries, Li polymer batteries, and Li-ion polymer batteries (henceforth generally classified as "Li batteries"), where an original cathode material (the "substrate particle") is coated with fine-particulate solids (the "deposit").

For the SIC process of the present invention, any material can be used as deposit, which forms a stable or meta-stable dispersion. Hence, it is also possible to use cheap mass products such as $TiO_2$, $Al_2O_3$, $TiO_2$, $BaSO_4$, etc., for the coating instead of expensive soluble precursors. Also carbon black can be coated by SIC process of the present invention.

With sol-gel and hydrolysis methods as the conventional coating technique, usually only precursors of the final deposit can be obtained by sol-gel and hydrolysis methods, which must then be transformed into the final form (usually the oxide) by firing (calcination). Hence, the preparation of optimized multinary phases such as surface-"doped" lithiated cathode materials of the type $Li_xM_aM_bn \ldots O_y$ is very difficult, in particular, if higher firing temperatures are required which result in a complete diffusion/reaction of the deposit into/with the substrate. Since with the SIC process the deposit can be obtained already in its final form, it is possible to perform a mild heat-treatment which leads to a spatially limited diffusion/reaction at the contact zone between core and shell only. Thus materials can be obtained with a concentration gradient of the "dopant" elements from the surface to the bulk. An interesting application for cathode materials is the production of phases $LiNi_{1-x}Al_xO_2$ or $LiCo_{1-x}Al_xO_2$ which are characterized by a composition-dependent conductivity resulting in a decreased conductivity with increasing charge, and which can therefore be used for an intrinsic overcharge-protection (T. Ohzuku, in: Handbook of Batteries, ed. J. O. Besenhard, Wiley-VCh, Weinheim, Germany, 1999, p. 323).

The heat-treatment in the present invention has several purposes below:

In all cases, the heat-treatment is required to remove the flocculant, which is used in the SIC process. If surfactants are used for the dispersion, also rests of surfactants in the deposit can be removed during the calcination. For instance, in the case of gelatin as flocculant, the heat-treatment above 550° C. is neccessary.

The heat-treatment can be used to transform the deposit of nano-particles into a compact layer by a growing together of the smaller particles to larger particles (sintering).

The heat-treatment can be used to induce a reaction between the bulk and the deposited particles and to obtain new phases.

For instance, in the case of $TiO_2$-coated $LiCoO_2$ a heat-treatment above 550° C. results in the reaction:

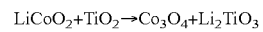
$$LiCoO_2 + TiO_2 \rightarrow Co_3O_4 + Li_2TiO_3$$

and it is possible to obtain a material consisting of a $LiCoO_2$ core, a $Co_3O_4$ inner shell and a $Li_2TiO_3$ outer shell.

The heat-treatment can be used to induce a reaction between different types of deposited particles.

If, for instance, $LiCoO_2$ is coated with $TiO_2$ and with $Li_2CO_3$, a heat treatment should result in the reaction:

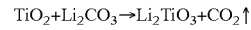
$$TiO_2 + Li_2CO_3 \rightarrow Li_2TiO_3 + CO_2\uparrow$$

and it is possible to obtain a material consisting of a $LiCoO_2$ core and a $Li_2TiO_3$ shell.

The heat-treatment can be used to obtain solid solutions. If, for instance, $LiCoO_2$ is coated with $LiAlO_2$ (or with $Al_2O_3$), the Al should diffuse into the $LiCoO_2$ and a solid solution of the type $LiCo_{1-x}Al_xO_2$ should be formed. The temperature and the duration of the calcination determine how far the Al can diffuse into the $LiCoO_2$, and thus determine the concentration profile of Al from the surface to the bulk of the particle.

To sum up, the exact temperature and the duration of the heat-treatment (calcination), depend on the system, and on the reaction which is desired.

For $TiO_2$-coated $LiCoO_2$ we have used various procedures, all resulting in the reaction given above:

(1) heating from room temperature to 750° C. within 4 h, resting at 750° C. for 2 h, cooling, (2) heating from room temperature to 650° C. within 4 h, resting at 650° C. for 2 h, cooling, or (3) heating from room temperature to 550° C. within 4 h, resting at 550° C. for 10 h, cooling.

The homogeneity and thickness of the deposited layer depends primarily on the SIC process of the present invention, and less on the heat treatment. However, it is likely, that the heat-treatment influences the porosities and the adherence of the "shell" to the "core" and that, for instance, a too rapid heating results in a break-off of parts of the shells.

The first solvent and second solvent of the SIC process of the present invention can be same or different, and can be selected from the group consisting of water, non-aqueous solvents, mixtures of non-aqueous solvents, or mixtures of non-aqueous solvents with water. Preferably the non-aqueous solvent is polar non-aqueous solvent, and the polar non-aqueous solvent includes, but is not limited to, alcohols, esters, ethers, ketones, sulfoxides, and lactames.

The fact that the SIC process of the present invention can be performed in organic solvents, in which the substrate particle is stable and in which it is possible to obtain stable dispersions of the deposit, e.g. in alcohols, ketones, aldehydes, etc., is especially interesting for cathode materials for Li batteries, as these compounds are usually sensitive to water, and as traces of water in the Li battery, which might be carried in with insufficiently dried cathode materials, deteriorate the battery performance.

A large number of water-soluble polymers have proven to be suitable for the coagulation-initiating pretreatment of substrates for a substrate-induced coagulation. The soluble polymer which can be used as flocculent includes, but is not limited to, water-soluble proteins and polysaccharides, and derivatives thereof.

The soluble polymer as flocculant can be polyelectrolytes with a positive or negative charge or betaines which simultaneously carry positive and negative charges. Examples of soluble polymer include gelatin, polyacrylamide, polyvinylpyrrolidones or polyvinyl alcohols, polyethylene glycols, polyethylene glycol ethers, epichlorohydrin-imidazole adducts, polyvinyl imidazoles, polysaccharides such as agar, starch, pectins or dextrans and sugar polymers such as alginic acid, carboxymethylcellulose, a copolymer of mannuronic acid and glucuronic acid, polycarboxylic acid such as polyacrylic acid or polyvinylphosphoric acid. Concentration of flocculant is generally 0.2~1.0 wt. % depending on the kind of flocculant.

The proper thickness of the deposit coated on the substrate particle is between 1 nm and 1 μm, preferentially between 5 and 500 nm.

The typical substrate particle includes, but is not limited to, $LiCoO_2$, $LiNiO_2$, $LiNi_xCo_{1-x}O_2$, $LiMn_2O_4$, and $LiFePO_4$, as well as compounds which may be derived from these by doping or substitution with other elements.

The deposit of particulate solid particles includes, but is not limited to, oxides, mixed oxides, hydroxides, carbonates, sulfates, and phosphates or hydrogen carbonates, hydrogen sulfates, hydrogen sulfites, hydrogen phosphates, hydrogen phosphites, or polyphosphates of Li, Na, K, Rb, Mg, Ca, Sr, Ba, Y, La, Ti, Zr, V, Nb, Cr, Mo, W, Mn, Re, Fe, Ru, Os, Co, Rh, Ir, Ni, Pd, Pt, Cu, Ag, Au, Zn, B, Al, Ga, In, Si, Ge, Sn, Pb, As, Sb, Bi, Se, Te, and rare earth metals, for example, Li2O, MgO, CaO, SrO, $TiO_2$, $ZrO_2$, ZnO, $Al_2O_3$, $In_2O_3$, $SnO_2$, $Y_2O_3$, $La_2O_3$, $Li_2TiO_3$, $CaTiO_3$, $BaTiO_3$, $BaSO_4$, $Li_2CO_3$, $LiCoO_2$, $LiNiO_2$, $LiNi_xCo_{1-x}O_2$, or $LiAlO_2$.

The deposit of particulate solid particles includes, but is not limited to, precursors yielding oxides, mixed oxides, hydroxides, carbonate and phosphates of Li, Na, K, Rb, Mg, Ca, Sr, Ba, Y, La, Ti, Zr, V, Nb, Cr, Mo, W, Mn, Re, Fe, Ru, Os, Co, Rh, Ir, Ni, Pd, Pt, Cu, Ag, Au, Zn, B, Al, Ga, In, Si, Ge, Sn, Pb, As, Sb, Bi, Se, Te, and rare earth metals by calcination in the presence of oxygen, such as acetates, oxalates, stearates, acetylacetonates, phthalocyanates, and other related metallorganic compounds.

Optimum content of particulate solid particles of substrate material is 0.1~1.0 wt. %. Excess coated material impedes intercalation/deintercalation of lithium, thereby decreases specific capacity of lithium intercalation material.

The standard SIC process as described in U.S. Pat. Nos. 5,705,219, 5,916,485, and 6,235,182 employs surfactant-stabilized dispersions, where the stability of the dispersion is adjusted by the relative amounts of surfactant and additional salts. Several dispersions, such as those of $TiO_2$, $Al_2O_3$, or $SiO_2$ in water, are already stable without the addition of surfactants and can therefore also be used without surfactants.

The heat-treatment following the coating step of the SIC process can be performed such that the flocculant is partly or fully decomposed and/or that a reaction is induced between the substrate particle and the deposit. This reaction may result in the formation of one or more new phases, thus yielding core-shell materials. Alternatively, if the substrate particle and the deposit can form solid solutions, this reaction may result in the diffusion of the cations from the deposit into the substrate particle or vice versa, thus forming doped/substituted materials with a concentration gradient of the dopant/substituent element(s) from the surface to the bulk.

The SIC process allows also to apply more than one type of particles onto the substrate either by using dispersions containing more than one type of particles, or by repeating the SIC coating with different dispersions containing one or more types of particles. The single SIC steps can, but need not, be separated by intermediate heat-treatment. This opens the possibility to synthesize core-multi-shell materials.

Finally, possible Li-deficiencies in the final material which might be caused by coating with Li-free compounds, such as $TiO_2$, $Al_2O_3$, etc., or by evaporation of Li during the heat-treatment, can be compensated for by coating with compounds which act as Li-source, such as $Li_2O$, $Li_2CO_3$, etc.

According to the present invention, the surface-doped/surface-substituted materials with a concentration gradient of the dopant/substituent from the surface to the bulk can be prepared by coating of $LiNiO_2$, $LiCoO_2$, or $LiNi_xCo_{1-x}O_2$ with $LiAlO_2$, which forms a solid solution with $LiNiO_2$, $LiCoO_2$, or $LiNi_xCo_{1-x}O_2$, or by coating of $LiNiO_2$, $LiCoO_2$, or $LiNi_xCo_{1-x}O_2$ with $TiO_2$ or $Al_2O_3$ and with $Li_2O$, $Li_2CO_3$, or with other compounds which act as Li source. The resultant of the surface-doped/surface-substituted materials can be $LiNi_{1-x}Al_xO_2$, $LiCo_{1-x}Al_xO_2$, or $LiNi_{1-x-y}Co_xAl_yO_2$.

The following examples are given for the purpose of illustrating the present invention and shall not be construed as being limitations on the scope or spirit of the invention.

EXAMPLES

Example 1

Synthesis of Core-Shell Materials of the Type $LiCoO_2$—$Co_3O_4$—$Li_2TiO_3$ by SIC-Coating of $LiCoO_2$ with $TiO_2$ in Water and Subsequent Heat-Treatment A 0.2 wt. % gelatin solution was prepared by dissolving an exactly weighed amount of gelatin (gelatin from porcine skin, type A, medium gel strength, bloom 180, from the company Fluka Biochimica) in water at 60° C. and then keeping for 24 h at 4-10° C. for ageing. Before usage the gelatin solution was warmed up to room temperature, and then its pH value was adjusted to a value between 8.8 to 9.0 by adding a 0.1 M KOH aqueous solution.

A $TiO_2$ dispersion was prepared by adding an exactly weighed amount of $TiO_2$ (Titandioxid C from the company Degussa, Germany, BET specific surface area: $50 \pm 15 \, m^2 \, g^{-1}$, average particle size: 21 nm) to water, stirring with a magnetic stirrer, slowly adding a 5 mM aqueous solution of sodium acetate (NaOAc), stirring with a magnetic stirrer for 5 min, and vigorous mixing with a turbo-mixer at 15000 rpm for 2 min. The relative amounts of $TiO_2$, NaOAc, and water were chosen such that the final concentrations were 1 wt. % $TiO_2$ and 0.5 mM NaOAc.

10 g $LiCoO_2$ powder (BET specific surface area: 0.25 m$^2$ g$^{-1}$) were added to 200 mL of the 0.2 wt. % gelatin solution and stirred for 5 min. The gelatin-conditioned $LiCoO_2$ powder was separated from the gelatin solution by centrifugation and decantation. It was washed by adding it to 500 mL water, stirring for 5 min, followed by separation by centrifugation and decantation. The washed, gelatin-conditioned LiCoO2 was added to 500 mL of the 1 wt. % $TiO_2$ dispersion and stirred for 5 min. The $TiO_2$-coated $LiCoO_2$ was separated from the remaining $TiO_2$ dispersion by centrifugation and decantation. To remove rests of non-adherent $TiO_2$ the $TiO_2$-coated $LiCoO_2$ was washed by adding the powder to 500 mL water, stirring for 5 min, and separating it by centrifugation and decantation. The powder was dried in vacuum at 70° C.

The $TiO_2$-coated powder was then calcined in a $ZrO_2$ crucible in air atmosphere. It was heated from room temperature to 750° C. within 4 h, held at 750° C. for 2 h, and cooled to room temperature in approx. 12 h. The $TiO_2$-coated powder was steel-blue before the calcination and olive-grey afterwards.

Figure 2:
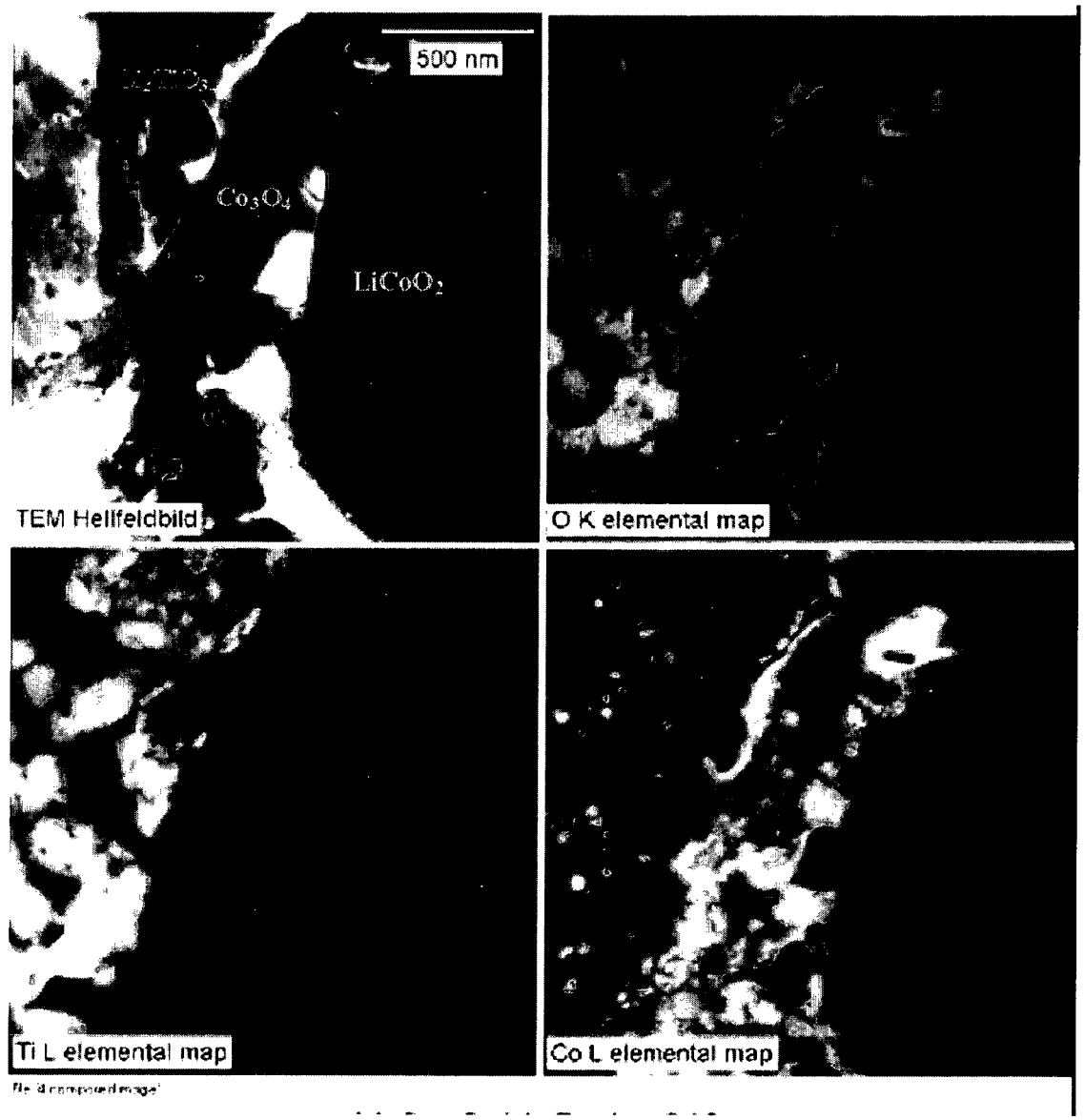
FIG. 2 are TEM bright-field image of $TiO_2$-coated $LiCoO_2$ prepared by Example 1 (top-left picture) and O, Ti, and Co elemental maps obtained by EFTEM of $TiO_2$-coated and heat-treated $LiCoO_2$.

X-ray diffraction measurements (FIG. 1) revealed that the coated and calcined material consists of the phases $LiCoO_2$, $Co_3O_4$, and $Li_2TiO_3$. Transmission electron microscopy (FIG. 2) combined with energy-dispersive X-ray analysis and electron energy loss spectroscopy of cross-sections of the coated and calcined particles revealed a core-shell structure with a $LiCoO_2$ core which is surrounded by a $Co_3O_4$ shell which again is surrounded by a $Li_2TiO_3$ shell.

Example 2

SIC-Coating of $LiCoO_2$ with $Al_2O_3$ in Water and Subsequent Heat-Treatment

A 0.2 wt. % solution of gelatin in water was prepared as described in Example 1.

A 1 wt. % $Al_2O_3$ aqueous dispersion was prepared by adding $Al_2O_3$ (from the company Degussa, Germany, BET specific surface area: 100±15 m$^2$g$^{-1}$, average particle size: 13 nm) to water, stirring with a magnetic stirrer for 5 min, turbo-mixing at 15000 rpm for 10 min, ultra-sonicating for 15 min, adding 35 mM NaOAc, and again stirring with a magnetic stirrer for 5 min.

60.0 g $LiCoO_2$ (BET specific surface area: 0.25 m$^2$g$^{-1}$) were added to 500 mL of the 0.2 wt. % gelatin solution and stirred for 5 min. The gelatin-conditioned $LiCoO_2$ powder was separated from the gelatin solution by centrifugation and decantation. The gelatin-conditioned $LiCoO_2$ was washed by stirring in 500 mL water, followed by separation by centrifugation and decantation. The washed, gelatin-conditioned $LiCoO_2$ was added to 500 mL of the 1 wt. % $Al_2O_3$ dispersion and stirred for 5 min. The $Al_2O_3$-Coated $LiCoO_2$ was separated from the remaining $Al_2O_3$ dispersion by centrifugation and decantation. To remove rests of non-adherent $Al_2O_3$, the $Al_2O_3$-coated $LiCoO_2$ was washed by adding the powder to 500 mL water, stirring for 5 min, and separating it by centrifugation and decantation. The powder was dried in vacuum at 70° C.

The $Al_2O_3$-coated powder was then calcined in a $ZrO_2$ crucible in air atmosphere. It was heated from room temperature to 650° C. within 4 h, held at 650° C. for 2 h, and cooled to room temperature within approx. 10 h.

Figure 3:
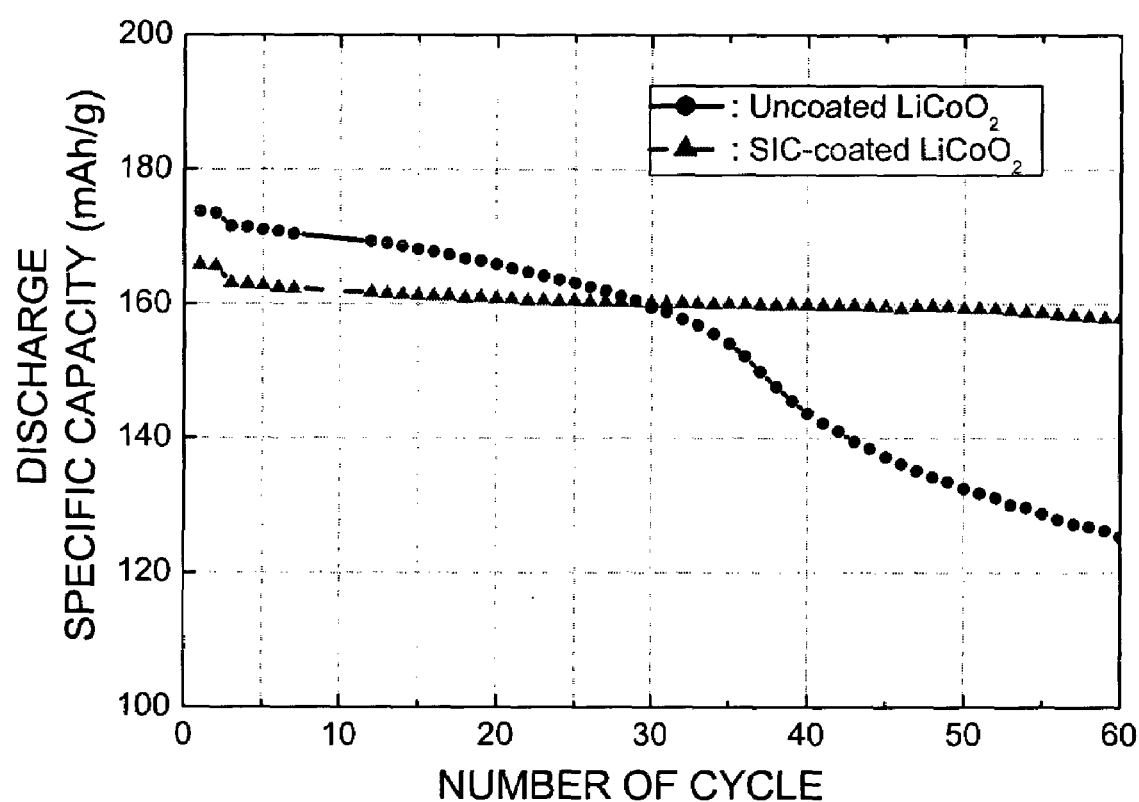
FIG. 3 is a graph showing specific capacity of $Al_2O_3$-coated $LiCoO_2$ prepared by Example 2, which is measured in the cut-off voltage range of 3.0-4.4 V vs. $Li/Li^+$ in 1M $LiPF_6$/ (EC: EMC).

Typical results of electrochemical cycling test of SIC-coated $LiCoO_2$ are presented in FIG. 3. Electrolyte formula was EC and EMC in the volume ratio of 1:2. As a solute for the electrolyte, LiPF6 (lithium hexafluoro phosphate) was used to form 1 M electrolyte. As shown in FIG. 3, the SIC-coated $LiCoO_2$ shows the better cycle behavior than uncoated one.

Example 3

Synthesis of Core-Shell Materials of the Type $LiCoO_2$—$Co_3O_4$—$Li_2TiO_3$ by SIC-Coating of $LiCoO_2$ with $TiO_2$ in Non-Aqueous Solvents and Subsequent Heat-Treatment.

A 0.2 wt. % polyvinylalcohol (PVA-flucculant) non-aqueous solution was prepared by dissolving PVA (Mowiol 4-80) in 1-methyl-2-pyrrolidone (NMP) at 60° C., cooling to room temperature, and adding ethanol. The volumetric ration of NMP to ethanol was 80:20.

A 10 wt. % $TiO_2$-in-ethanol dispersion was prepared by adding rigorously dried $TiO_2$ (Titandioxid C from the company Degussa, Germany, BET specific surface area: 50±15 m$^2$g$^{-1}$, average particle size: 21 nm) to water-free ethanol, stirring with a magnetic stirrer for 10 min, and ultra-sonicating for 5 min. Optionally, the stability of dispersion can be adjusted by the addition of water-free acetic acid.

10 g $LiCoO_2$ powder (BET specific surface area: 0.25 m$^2$ g$^{-1}$) were added to 200 mL of the PVA in NMP/ethanol solution and stirred for 5 min. The PVA-conditioned $LiCoO_2$ powder was separated from the PVA solution by centrifugation and decantation. It was washed by suspending it in 200 mL of a water-free NMP:ethanol (80:20 by vol.) mixture, stirring for 5 min, followed by separation by centrifugation and decantation. The washed, PVA-conditioned $LiCoO_2$ was added to 100 mL of the 10 wt. % $TiO_2$-in-ethanol dispersion and stirred for 5 min. The $TiO_2$-coated $LiCoO_2$ was separated from the remaining $TiO_2$ dispersion by centrifugation and decantation. To remove rests of non-adherent $TiO_2$ the $TiO_2$-coated $LiCoO_2$ was washed by adding the powder to 100 mL water-free ethanol, stirring for 5 min, and separating it by centrifugation at 500 rpm for 5 min and decantation. The powder was dried in vacuum at 70° C.

The $TiO_2$-coated $LiCoO_2$ powder was calcined as described in Example 1.

What is claimed is:

1. A method for producing a surface-modified material for a cathode material, comprising the steps of
   (i) treating a bulk of material with a solution containing a first solvent and at least one flocculant comprising a soluble polymer so that the flocculant adheres to the bulk;
   (ii) subsequently contacting the flocculant-treated bulk of step (i) with a dispersion containing a second solvent and a particulate solid particle(s) to deposit the particulate solid particles on the flocculant-treated bulk; and
   (iii) subsequently treating the resultant of step (ii) with heat at a temperature of more than about 550° C. to create a concentration gradient of one or more dopant or substituent element(s) from the surface to the bulk, and/or core-shell materials with the core and the shell(s) being different distinct phases,
   wherein the surface modified material is a cathode material with modified surface layers for Li batteries, Li-ion batteries, Li polymer batteries, and Li-ion polymer batteries, where an original cathode material is coated with fine-particulate solid particles, and
   wherein the bulk of material is $LiCoO_2$, and wherein the dispersion of step (ii) is a dispersion solution of TiO$_2$, and the particulate solid particle(s) is TiO$_2$.

2. The method according to claim 1, wherein the first solvent and second solvent are independently water, non-aqueous solvents, mixtures of non-aqueous solvents, or mixtures of non-aqueous solvents with water.

3. The method according to claim 1, wherein the soluble polymer is selected from the group consisting of water-soluble proteins and polysaccharides, and derivatives thereof.

4. The method according to claim 1, wherein the dispersion of step (ii) contains more than one type of particulate solid particles so that more than one type of particulate solid particles are coated on the bulk.

5. The method according to claim 1, wherein the step (ii) is repeated twice or more before performing step (iii) and the dispersion of each step (ii) contains the same or different type of particulate solid particles so that one or more type of particulate solid particles are coated on the bulk.

6. The method according to claim 1, wherein the step (i), (ii) and (iii) are repeated twice or more and the dispersion of each step (ii) contains the same or different type of particulate solid particles so that one or more type of particulate solid particles are coated on the bulk.

7. The method according to claim 1, wherein the heat-treatment of the step (iii) induces a partial or complete reaction between the bulk and the particulate solid particles coagulated on the bulk with the formation of one or more new phases.

8. The method according to claim 1, wherein the heating at a temperature of more than about 550° C. is for up to about four hours.

* * * * *